United States Patent [19]

Nishimura et al.

[11] Patent Number: 4,529,961
[45] Date of Patent: Jul. 16, 1985

[54] TIRE PRESSURE SENSOR AND SENSING SYSTEM

[75] Inventors: Hiroaki Nishimura; Yutaka Suzuki, both of Yokosuka, Japan

[73] Assignee: Nissan Motor Company, Limited, Japan

[21] Appl. No.: 545,253

[22] Filed: Oct. 25, 1983

[30] Foreign Application Priority Data

Nov. 8, 1982 [JP] Japan ................. 57-168951

[51] Int. Cl.³ ............................................. B60C 23/00
[52] U.S. Cl. ................................. 340/58; 340/870.33; 340/626; 73/146.5; 200/61.26
[58] Field of Search ...................... 73/146.5, 489, 733, 73/735, 742; 116/34 R; 200/61.25, 61.26; 340/52 F, 52 R, 58, 870.32, 870.33, 626

[56] References Cited

U.S. PATENT DOCUMENTS

| | | | |
|---|---|---|---|
| 3,930,223 | 12/1975 | Tsagas | 340/58 |
| 4,119,944 | 10/1978 | Smith | 340/58 |
| 4,157,530 | 6/1979 | Merz | 340/58 |
| 4,163,208 | 7/1979 | Merz | 340/58 |
| 4,174,515 | 11/1979 | Marzolf | 340/58 |
| 4,237,445 | 12/1980 | Crossman | 340/58 |
| 4,312,001 | 1/1982 | Marzolf | 340/870.32 |
| 4,348,896 | 9/1982 | Sarides | 73/146.5 |

FOREIGN PATENT DOCUMENTS 55-31975  5/1980  Japan .

Primary Examiner—John W. Caldwell, Sr.
Assistant Examiner—Michael F. Heim
Attorney, Agent, or Firm—Leydig, Voit, Osann, Mayer and Holt, Ltd.

[57] ABSTRACT

A wheel-mounted tire pressure sensor employs a Bourdon tube which deforms in relation to tire pressure to drive a pivotal arm. Opposite ends of the arm support magnets which can close reed switches arrayed around the path of travel of the magnets. The reed switches are connected to passive resonators in such a way that for each of a number of regions of travel of the arm, a unique combination of resonators is activated. The resonators are connected to a wheel-mounted antenna which faces a stationary antenna. Frequency signal matching the frequencies of the resonator are sequentially broadcast by the stationary antenna to the resonators, which are excited to oscillate if activated by the corresponding switch or switches. The excited resonator broadcast their frequencies back to the stationary antenna and to a display unit which decodes the combination of resonator frequencies to display the corresponding tire pressure. An optional alarm unit includes a memory unit which holds maximum safe speed values for each of the detectable ranges of tire pressure. The sensed tire pressure is converted to the corresponding speed limit value which is then compared to the sensed vehicle speed. If actual vehicle speed exceeds the preset safe value, an alarm is generated.

12 Claims, 5 Drawing Figures

TIRE PRESSURE SENSOR AND SENSING SYSTEM

BACKGROUND OF THE INVENTION

The present invention relates to a tire air pressure sensor used for vehicles such as automotive vehicles, and a tire air pressure measuring apparatus incorporating the sensor.

Japanese unexamined patent application No. Sho. 55-31975 published Mar. 6, 1980 teaches an extraordinary-pressure sensor which includes a pressure-responsive switch which is opened and closed when the tire air pressure is normal and abnormal, respectively. When the tire pressure is to be sensed, a signal transceiver is operated, thereby producing an electromagnetic signal having a predetermined frequency which is then transmitted via an antenna to a coil antenna. The coil receives the transmitted signal and outputs it to a crystal resonator which has a resonant frequency equal to the frequency of the received signal thereby causing the resonator to resonate when the pressure-responsive switch is open. Then the transceiver stops transmitting the electromagnetic signal. For some interval after the end of transmission of the electromagnetic signal, the crystal resonator continues to resonate, thereby producing an electromagnetic signal having the same frequency as the resonant frequency and transmitting the signal via the coil toward the antenna. The signal recieved by the antenna is supplied to the receiver unit of the transceiver system, thereby displaying that the tire air pressure is normal. On the other hand, when the switch is closed, which implies that the tire pressure is abnormal, the resonator does not resonate because the resonator is short-circuited and therefore not energized. A plurality of such resonators having different resonant frequencies can be provided together with a transceiver system which can produce corresponding frequencies in order to sense different air pressures.

SUMMARY OF THE INVENTION

It is an object of the invention to provide a wheel-mounted tire pressure sensor capable of monitoring tire pressure through a plurality of pressure ranges. Another object is to minimize the cost of materials used in the manufacture of the tire pressure sensor.

Additional objects include providing a tire pressure sensing system suitable for use with the above tire pressure sensor and enhancing the accuracy of such a tire pressure sensor by means of contactless electrical actuation. Another important object is provision of an alarm system by which a vehicle operator can be informed of dangerously low tire pressure with respect to vehicle speed.

The invention employs a plurality of passive electromagnetic resonators which are activated in unique combinations to produce unique combinations of electromagnetic frequencies in accordance with different ranges of tire air pressure. The resonators are activated by a contactless electrical actuator comprising a magnet-tipped arm pivoting smoothly in accordance with air pressure within the tire. The magnets on either end of the arm trip reed switches connected to the resonators and advantageously arranged to resolve the range of travel of the arm into six or seven detection ranges in a particularly advantageous embodiment of the invention, each represented by a unique combination of only 3 resonators.

The resonators are excited in sequence by signals of corresponding frequency transmitted by a stationary antenna and received by a wheel-mounted antenna connected to each of the resonators in parallel. When the stationary antenna stops transmitting, the resonators activated via the corresponding reed switches continue to oscillate at least briefly, thus transmitting their characteristic frequencies back from the wheel antenna to the stationary antenna.

A tire pressure sensing system receives the signals received by the stationary antenna and displays digitally the tire pressure indicated by the received combination of resonant frequencies. The sensing system includes an actuator having the same structure as the actuator mentioned above and may include an alarm unit which checks the tire pressure and vehicle speed and generates an alarm or warning when the sensed vehicle speed is higher than a predetermined safe level for the given tire pressure.

DETAILED DESCRIPTION OF THE PREFERRED EMBODIMENT

Figure 1:
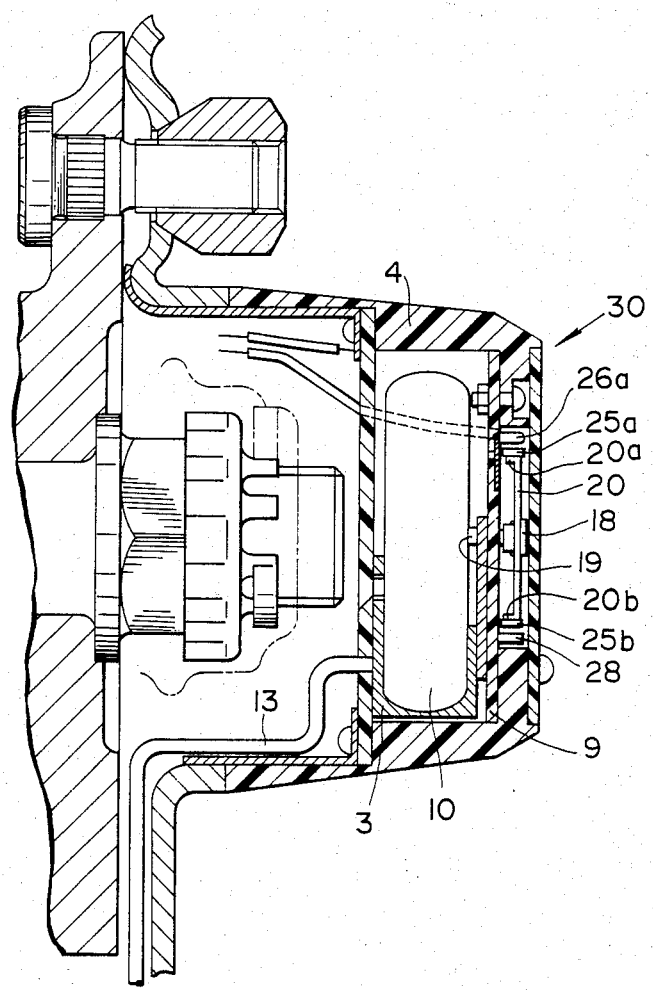
FIG. 1 is a cross-sectional view of a preferred embodiment of a tire air pressure sensor according to the present invention as mounted in the hub cap of a vehicle wheel.
Figure 2:
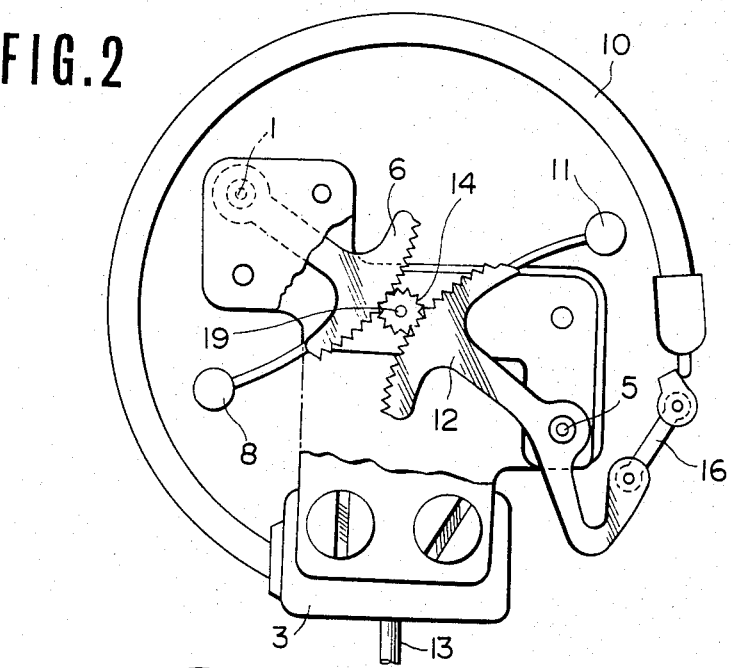
FIG. 2 is an example of a Bourdon and its driving mechanism which can be used for the drive section of the sensor of the present invention.
Figure 3:
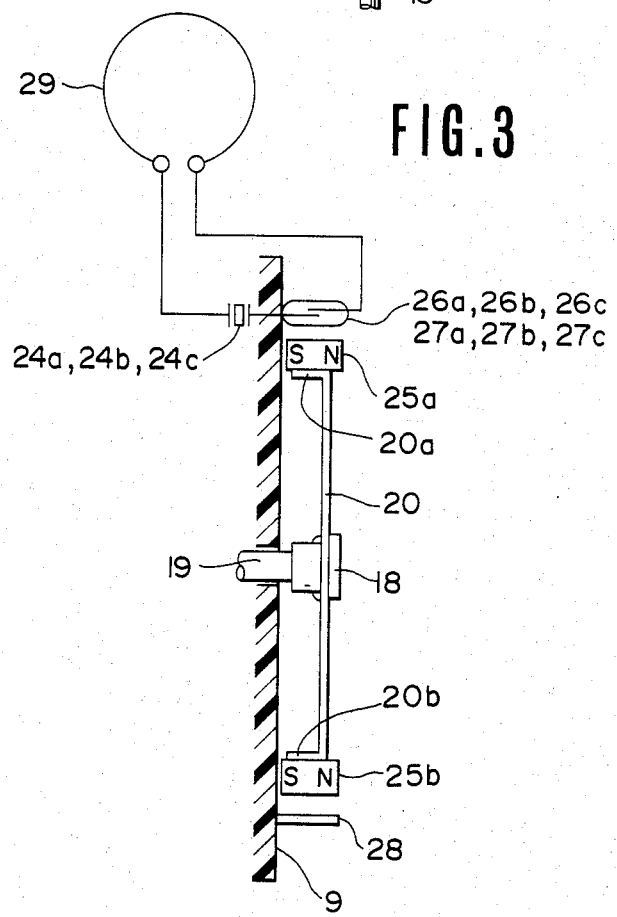
FIG. 3 is an enlarged diagrammatic elevation of part of the sensor.

FIGS. 1-3 illustrate the overall structure of the tire pressure sensor 30 of the present invention. A drive section (FIG. 2) and a sensing section (FIG. 3) are spatially separated by a base plate 9 and are functionally connected by a common pivotable axle 19 extending through the base plate 9. The pressure sensor 30 is wholly housed within the hubcap 4 of the tire to be monitored and is exposed to the air pressure within the tire via a hose or tube 13.

Specifically, tire pressure is transmitted to a Bourdon tube 10 which actually drives the rest of the sensor. One end of Bourdon tube 10 is fixed to the hubcap via a support base 3. The other end of Bourdon tube 10 is attached pivotably to the untoothed end of a sector gear 12, which is pivoted at 5, via a link 16. The toothed end of the gear 12 engages a pinion gear 14 fixed to one end of the drive axle 19. Another sector gear 6, pivoted at 1, has a toothed end which also engages pinion gear 14 in opposing relationship to sector gear 12. Another weight 8 fixed to gear 6 symmetrically opposes weight 11 to balance their net moment of inertia. This arrangement ensures that the rotation of drive axle 19 will be essentially independent of wheel angular velocity.

The radius of curvature of Bourdon tube 10 changes in proportion to changes in its internal air pressure, as is well-known. Thus, as tire pressure increases, the free end of Bourdon tube 10 moves outward, causing sector gear 12 to pivot about its axis 5. Thus, changes in tire air pressure are transmitted to the sensing section by rotation of drive axle 19.

Figure 4:
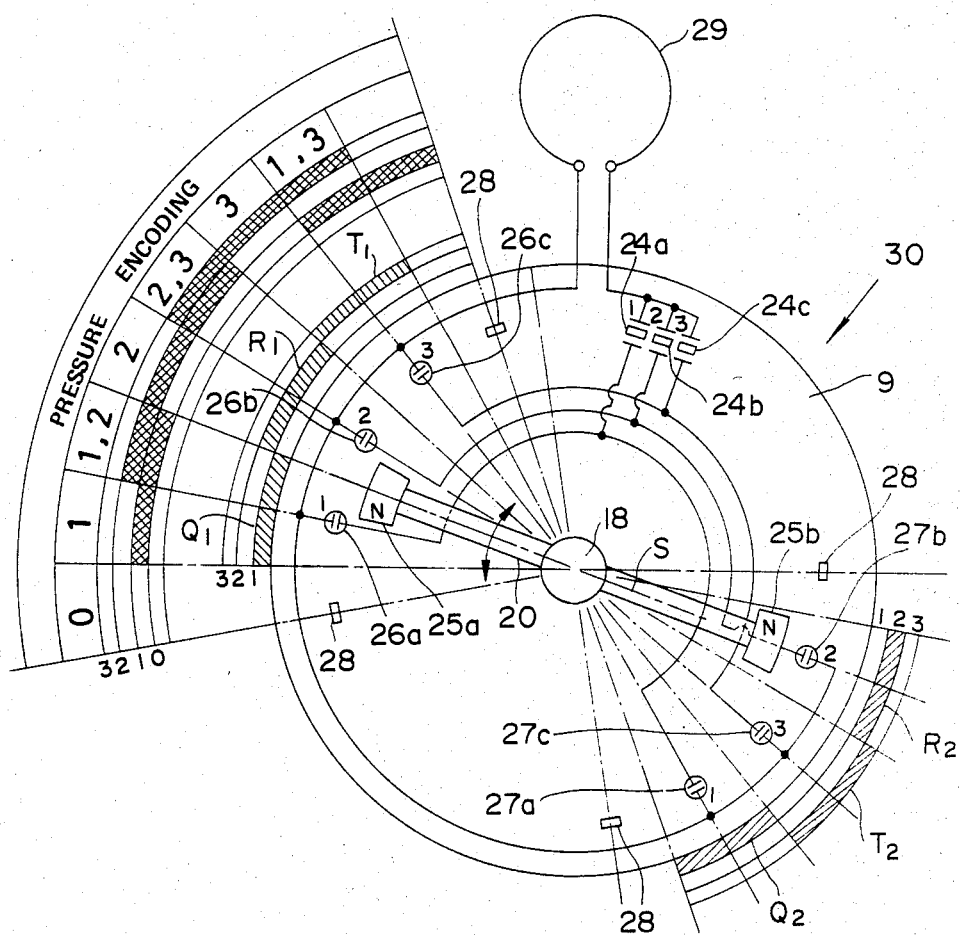
FIG. 4 is a diagrammatic plan view of the sensor.

The sensing section is illustrated in detail in FIGS. 3 and 4. A pivotal arm 20 is fixed to the free end of axle 19 by means of a collar 18 centered along the arm 20. Flanges 20a, 20b at opposite ends of arm 20 support permanent magnets 25a, 25b. The dimensions of arm 20 and masses of magnets 25a, 25b are matched as nearly as possible to balance the ends of the arm 20 about the drive axle 19.

The electrical circuitry of the sensing section is for the most part arranged on the base plate 9. In this embodiment of the invention, two sets 26, 27 of three reed switches each (a, b, c) lie on essentially opposite sides of the axle 19 with all of the reed switches 26a-27c being equidistant from axle 19. The reed switches a, b, c, of each set 26, 27 are spaced equiangularly and ferromagnetic switch dummies 28 may be provided angularly outside of each set of switches to enhance and balance the magnetic forces acting on the magnets 25a, 25b due to their proximity to the switches and dummies. One terminal of each of the reed switches is connected to one terminal of an antenna 29. Three resonators 24a, 24b, 24c operating at distinct frequencies 1, 2 and 3 are connected in parallel to the other terminal of the antenna 29 and each is connected to the other terminals of the corresponding reed switches 26a and 27a, 26b and 27b, 26c and 27c, respectively. The reed switches are so spaced relative to each other and to the travel of the magnets 25a, 25b that throughout the range of travel of the arm 20 only one switch a, b or c of each set at a time can be closed by the force of the opposing magnet 25a or 25b. In the illustrated embodiment, one switch from each set (i.e., two switches) will be closed through most of the travel of arm 20, but at either extreme, a total of only one switch will be closed. When closed, each reed switch connects the corresponding resonator to the antenna 29.

The angular spacing of the reed switches defines a plurality of detection sectors centered over each of the switches 26a-27c. For convenience, these sectors will be labelled Q, R, or T, corresponding to switches a, b, or c, and with subscripts 1 or 2, corresponding to sets 26 and 27. Further description of the positions and shapes of the sectors, for example sector $Q_1$, will imply corresponding information about the switch, for example reed switch 26a, over which the sector is centered.

The two sets of sectors do not precisely oppose one another; rather, they are angularly offset by half the width of a sector, so that a diametric line bisecting a sector of one set passes between two sectors of the other set. In addition, the two sets of switches are arranged out of sequence so that sector $Q_1$ opposes (approximately) sector $R_2$, $R_1$ opposes $T_2$, and $T_1$ opposes $Q_2$. These two provisions result in a kind of encoding by which six different regions of travel of arm 20 are each represented by a unique combination of resonator frequencies 1, 2 and 3, as indicated in FIG. 4. For example, in the position shown in FIG. 4, magnet 25b closes switch 27b to complete a circuit including resonator 24b (frequency 2). As the arm 20 moves clockwise, switch 26b is tripped by magnet 25a, so that only resonator 24b is enabled. However, if the arm 20 pivots counter-clockwise from the shown position, both switches 27b and 26a will be closed so that resonators 24a and 24b will both be connected to the antenna 29. Furthermore, a seventh region of travel can be detected by the absence of any resonator signals transmitted over the antenna (the area labelled "0" in FIG. 4).

Those skilled in the art will recognize that provision of a second set of reed switches offset from the first set effectively doubles the resolution of the tire pressure sensor 30 without requiring an excessively long and unwieldy pivot arm 20. In addition, by arranging the reed switches to enable unique combinations of resonators, the total number of resonators, which are rather expensive and occupy space, can be minimized.

Figure 5:
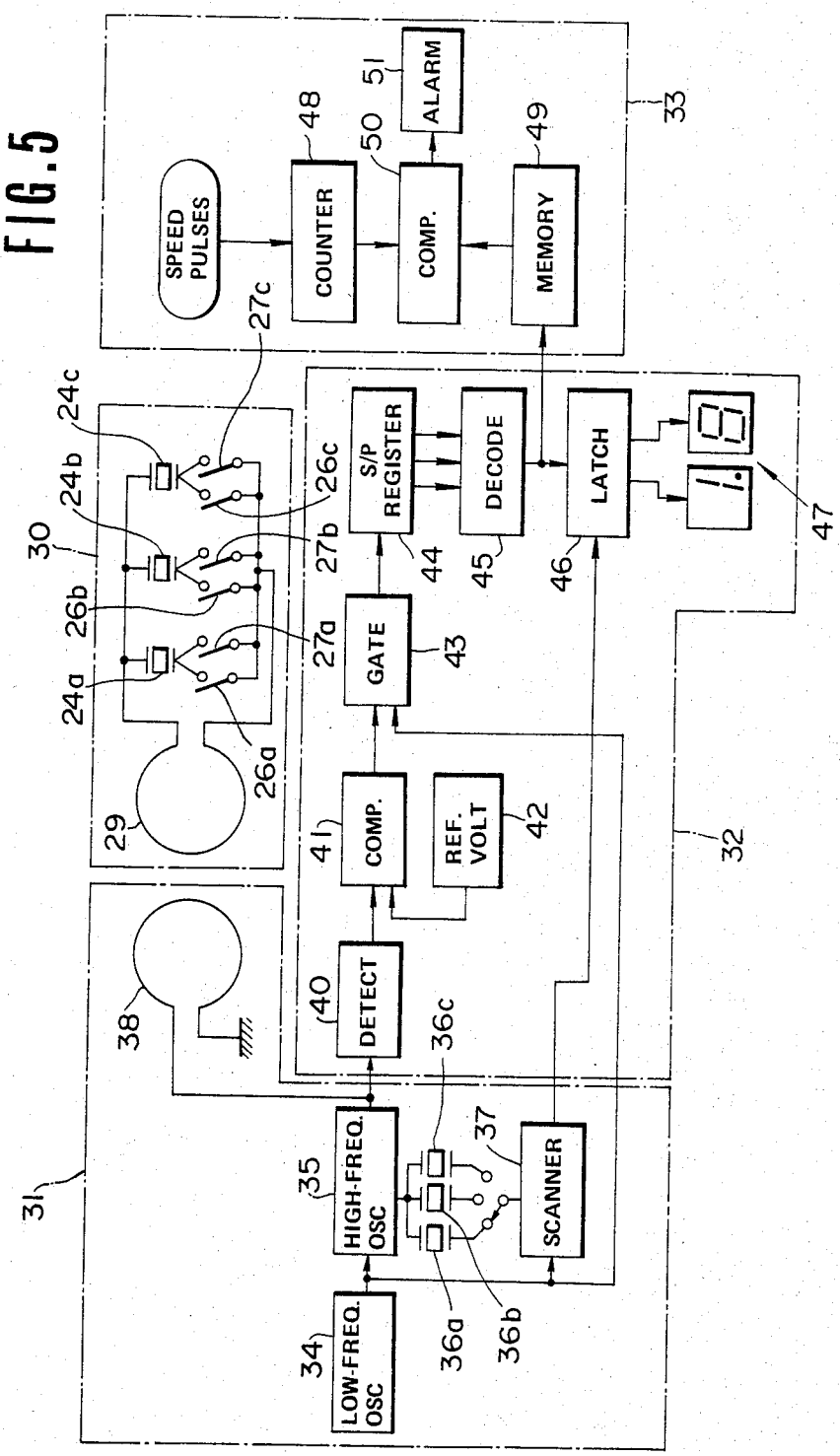
FIG. 5 is a circuit diagram of a tire air pressure measuring system incorporating the sensor.

FIG. 5 is a block diagram of an air pressure measuring apparatus incorporating the tire air pressure sensor 30 described above. The apparatus includes the sensor 30, an electromagnetic wave generator 31, a detection and pressure display unit 32 and a speed alarm unit 33. Generator 31 includes a low-frequency oscillator 34 which produces a rectangular timing pulse signal, a high-frequency oscillator 35, which produces a sinusoidal waveform signal, connected to the output of oscillator 34, three crystal resonators 36a, 36b, 36c having the same frequencies as resonators 24a, 24b, 24c, respectively and constituting part of high-frequency oscillator 35, a scanner 37 and an antenna 38. Low-frequency oscillator 34 controls the timing of generation and termination of the high-frequency signal produced by oscillator 35. Oscillator 34 also provides a pulse signal to scanner 37 which divides the low-frequency signal from low-frequency oscillator 34 to sequentially switch and activate resonators 36a, 36b, 36c. Scanner 37 also sends a hold signal to a latch 46 of detection and pressure display 32 to hold the signal value of latch 46 for one cycle of activation of the resonators 36a, 36b, 36c. The output signals of resonators 36a, 36b, 36c each are amplified by high-frequency oscillator 35 when connected by scanner 37. When the oscillator 35 stops oscillating, antenna 38 receives a signal from antenna 29, whereby an attenuating return signal is inputted to a detector 40. To facilitate reception, the antennae 29, 38 are disposed as close to one another as possible. For example, antenna 29 may be mounted along the inboard surface of the wheel rim with the antenna 38 mounted on the chassis directly opposite antenna 29.

Detection and pressure display 32 includes detector 40, a comparator 41, a reference voltage generator 42, a gate 43, a serial to parallel conversion register 44, a decoder 45, a latch 46 and a display 47. Detector 40 filters the incoming signals returned from antenna 38 to derive their envelope and then outputs the result to comparator 41 which compares the output of detector 40 with the reference signal from generator 42 and sends an output signal to gate 43 when the magnitude of the signal from detector 40 is greater than that of the reference signal. Gate 43 is opened during the absence of pulses of the pulse signal from low-frequency oscillator 34 in order to pass the return signal. A delay element may be provided between low-frequency oscillator 34 and gate 43 in order to improve the timing of opening gate 43.

The output pulses from gate 43 are stored in series-parallel conversion register 44 whereupon the total number of pulses received during the three-phase scanning cycle is converted into a 3-bit parallel signal which is supplied to a decoder 45. Decoder 45 converts the 3-bit parallel signal to a corresponding BCD signal, performs 7-segment encoding or the like on the BCD signal and outputs the resulting signals to latch 46. Latch 46 holds digital data from decoder 45 for one cycle of scanning and causes digital display 47 to display the decoded digital value. In the described embodiment, the tire air pressure is displayed digitally whereas an apparatus may be provided which displays the tire air pressure as an analog value.

A speed alarm 33 includes a counter 48, a memory 49, a comparator 50 and an alarm 51. Counter 48 counts speed pulses from a vehicle speed sensor (not shown) for a fixed period and outputs the counted contents to a comparator 50. A memory 49 stores a plurality of preset values representing maximum safe speed values at each of the sensible tire pressure ranges. Memory 49 holds the preset values in an order according to the range of output signals from decoder 45 and outputs a signal corresponding to the preset value in response to the corresponding decoder output. Comparator 50 compares the signal from counter 48 with the signal from memory 49 and produces an output to an alarm 51 when the sensed vehicle speed is higher than the indicated safe speed at the sensed tire air pressure, whereby alarm 51 alerts the driver to the fact.

The tire air sensor 30 is the only element of the tire air pressure measuring apparatus mounted on the side of the road wheel and the other remaining components of the apparatus, such as electromagnetic wave generator 31, detection and pressure display 32 and speed alarm 33, are installed within the vehicle body.

In operation, the tire air pressure acts on the inside of Bourdon tube 10 to resiliently deform same. This deformation is transmitted as an angular displacement via link 16, sector gear 12, pinion 14 and pivot 19 to rotary arm 20. Magnets 25a, 25b are accordingly shifted to a new position where the magnetic action of magnets 25a, 25b may be exerted on no reed switches, or on one or two of reed switches 26a, 26b, 26c, 27a, 27b, 27c. Arm 20 rotates without coming into contact with anything, so that arm 20 can pivot smoothly in proportion to the tire air pressure. This arrangement causes no hysterisis between the two directions of rotation of arm 20. Since the spacing of two adjoining reed switches is chosen to be relatively wide in order to enable the tire air pressure to be measured throughout a relatively wide range, the magnitude of force of magnetic attraction between the reed switches and the magnets would vary with their relative positions if switch dummies 28 were not disposed angularly outside of the reed switches, so that arm 20 would rotate stepwise in response to the tire air pressure and not smoothly in proportion to the pressure. In the illustrated embodiment, however, switch dummies 28 are disposed circumferentially outside of each set of reed switches in order that magnets 25a, 25b exert a constant magnetic force on adjacent reed switches through their range of travel. Consequently, this ensures a smooth and continuous pivotal movement of arm 20 in response to the tire air pressure.

Now assume that arm 20 in response to the tire air pressure is in the position shown in FIG. 4. The magnetic force of right-hand magnet 25b closes reed switch 27b connected to crystal resonator 24b, thereby forming a closed resonance circuit. Left-hand magnet 25a, as shown, is in a position in which it exerts a magnetic force on both reed switches 26a and 26b which are connected to crystal resonators 24a and 24b, but exert enough force only to close reed switch 26a to activate resonator 24a. Thus at this time, the tire has an air pressure in the pressure range labelled (1, 2). However, if arm 20 rotates even slightly clockwise from the shown position, the corresponding tire pressure would be represented by pressure range (2).

In the particular embodiment, the contactless switch mechanism consists of reed switches and magnets. Alternatively, the contactless switch mechanism may consist of Hall-effect elements. However, when the Hall-effect elements are employed for this purpose, they are expensive and require a power supply for operation as well. Additionally, since the tire air sensor is installed in a limited space in the road wheel and rotates at high speeds, it is difficult and undesirable to install the power supply in the limited space as well. In contrast, the present invention employs reed switches and permanent magnets, but no power supply. The present invention uses reed switches which are inexpensive, thereby providing an inexpensive tire-air pressure sensor and improving the accuracy of measurement.

The overall operation of the tire-air pressure measuring apparatus of FIG. 5 will now be described. The signals radiated from antenna 38 of electromagnetic wave generator 31 are recieved by antenna 29. The energy of the recieved signal sequentially excites for example crystal resonators 24a and 24b when reed switches 26a and 27b are actuated by the action of the permanent magnets 25a and 25b. The resonance signals from crystal resonators 24a and 24b are in turn transmitted sequentially from antenna 29 to antenna 38 during the quiescent period determined by low-frequency oscillator 34. The energy received by antenna 38 is conducted to detector 40 which filters the recieved signal to eliminate all frequency components other than the resonator frequencies. Comparator 41 and gate 43 sense attenuating oscillations in the detected signal. The signal reflecting the combination of frequencies of the return signals from resonators 24a and 24b is subjected to a conversion process by series-to-parallel conversion register 44 and decoder 45, sent to latch 46 and then displayed as tire air pressure by display segments 47.

The advantage of the electromagnetic wave generator 31 lies in the space and weight requirements of the sensor 30. That is, the sensor per se must be as light as possible to avoid fuel waste and tire wear, and must be small enough to fit within a hubcap. Since the wave generator 31 provides the energy needed for the resonators 24a, b, c to oscillate, the sensor 30 does not require a separate power supply. Thus, the sensor can be assembled solely with small, light, relatively inexpensive components.

While the present invention has been described and illustrated in terms of a preferred embodiment thereof, the present invention should not be limited to this embodiment. Various changes and modifications could be made by those skilled in the art without departing from the scope of the invention as set forth in the attached claims.

What is claimed is:

1. A tire pressure sensor comprising:
   an actuator responsive to a known range of tire pressure to move through a known range of travel with a one-to-one correspondence between tire pressure and actuator position,
   circuit means including
      a plurality of switches actuable magnetically by the actuator and arranged so as to divide said range of travel of the actuator into a plurality of detection fields, each of which fields is characterized by a unique combination of actuated and unactuated switches, and further including
      a plurality of resonators each of which has a different resonant frequency and is connected to at least one of said switches, and means for inputting to the circuit means a first signal comprising the different resonant frequencies and for outputting a second signal generated by the resonators whereby, for each of said detection fields, the resonators output a unique combination of frequencies.

2. The tire pressure sensor of claim 1 wherein the sensor is mounted on the wheel of the tire to be monitored and wherein the inputting and outputting means includes an antenna mounted on the wheel in order to be able to transmit the current combination of frequencies to a portion of a vehicle on which the wheel is mounted and which does not rotate with the wheel.

3. The tire pressure sensor of claim 1 wherein the actuator comprises an elongated arm which pivots about its center in accordance with tire pressure and which has magnets attached to each of its ends, and wherein the switches are arranged concentrically about the center of the arm in approximate angular alignment with the pivotal range of travel of each of the magnets so that two approximately opposing groups of switches are formed, the switches of each of said groups being equi-angularly spaced by an amount just sufficient to ensure that only one switch of each group will be actuated by the corresponding magnet at a time, the switches of one group being offset by half of said angular spacing from the switch or switches of the other group most nearly diametrically opposed thereto, the resonators being connected to exactly one switch of each of said groups, the switches of the two groups being connected in different sequences, whereby half of said angular spacing corresponds to a detection field.

4. The tire pressure sensor of claim 3 wherein ferromagnetic switch dummies are provided angularly outside of each group of switches to facilitate smooth pivotal movement of the arm.

5. The tire pressure sensor of claim 1 wherein the actuator comprises a drive section exposed to the air within the tire, which drive section translates changes in pressure within the tire to changes in the angular position of a pivotable shaft, and an actuating arm fixed at its center for rotation with the shaft, the arm serving to amplify the pivotal movement of the shaft.

6. The sensor of claim 1, wherein each of said plurality of switches comprises a reed switch.

7. A tire pressure sensing system for a vehicle comprising:

a tire pressure sensor disposed on the wheel of the tire to be monitored and responsive to the air pressure within said tire to broadcast a wireless electromagnetic signal encoded to indicate which of a plurality of ranges the air pressure within said tire falls, said sensor including an actuator responsive to a known range of tire pressure to move through a known range of travel with a one-to-one correspondence between tire pressure and actuator position; circuit means including a plurality of switches actuable magnetically by the actuator and arranged so as to divide said range of travel of the actuator into a plurality of detection fields, each of which fields is characterized by a unique combination of actuated and unactuated switches, and further including a plurality of resonators, each of which has a different resonant frequency and is connected to at least one of said switches; and means for supplying to the circuit means a first signal comprising the different resonant frequencies and braodcasting a second signal generated by the resonators whereby, for each of said detection fields, the resonators output a unique combination of frequencies; and a reception and display unit responsive to said broadcast signal to display the sensed tire pressure.

8. The system of claim 7, further comprising an alarm unit which receives signals indicative of the tire pressure to be displayed and of the speed of the vehicle, compares said received signals and generates an alarm when the results of the comparison indicate that the tire pressure is lower than a safe level predetermined in accordance with vehicle speed.

9. The system of claim 7 wherein the tire pressure sensor comprises an actuator exposed to tire air pressure and driven by tire pressure through a fixed range of travel in a one-to-one correspondence between actuator position and tire pressure, said plurality of electromagnetic resonators activated to broadcast a sequence of unique combinations of frequencies as the actuator is driven through its range of travel.

10. The system of claim 9, wherein each of the resonators of the tire pressure sensor responds to frequency signals matching its resonant frequency to be excited to broadcast its resonant frequency if activated by the actuator, and further comprising an electromagnetic wave generator operating periodically to broadcast sequentially the resonant frequencies of each of the resonators to the tire pressure sensor and to cease broadcasting for a predetermined time, whereby during said predetermined time, the resonators activated by the actuator broadcast their resonant frequencies to the reception and display unit solely by the force of excitation of the frequency signals from the electromagnetic wave generator.

11. The system of claim 7, wherein each of said plurality of switches, comprises a reed switch.

12. The tire pressure sensor of claim 3 wherein the actuator comprises a drive section including a Bourdon tube which is exposed to the air within the tire for translating changes in pressure within the tire to corresponding positional changes, said drive section further including a sector gear rotated in accordance with the displacement of the Bourdon tube, said sector gear having a weight at one end of the sector, a pinion firmly connected to the center of said arm and associated with the gear of said sector gear for being rotated in accordance with the rotational angle of said sector gear, and a second sector gear associated with said pinion in opposing relationship to the first mentioned sector gear for being rotated in accordance with the rotational angle of said pinion, said second sector gear having a weight at one end of the sector for symmetrically opposing said first mentioned weight so that centrifugal forces acting on the two weights balance a centrifugal force acting on the Bourdon tube.

* * * * *